United States Patent
Lim et al.

(10) Patent No.: US 7,394,929 B2
(45) Date of Patent: Jul. 1, 2008

(54) DIGITAL PICTURE IMAGE COLOR CONVERSION

(75) Inventors: Suk Hwan Lim, Mountain View, CA (US); D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 743 days.

(21) Appl. No.: 10/669,774

(22) Filed: Sep. 24, 2003

(65) Prior Publication Data

US 2005/0063583 A1 Mar. 24, 2005

(51) Int. Cl.
G06K 9/00 (2006.01)
G03F 3/08 (2006.01)

(52) U.S. Cl. .................. 382/167; 382/162; 358/518; 358/519; 358/520; 358/521

(58) Field of Classification Search .............. 382/162, 382/166, 167; 345/590; 348/470; 358/518–521
See application file for complete search history.

(56) References Cited

U.S. PATENT DOCUMENTS

| 5,552,904 | A * | 9/1996 | Ryoo et al. ............... 358/518 |
| 5,987,167 | A * | 11/1999 | Inoue ....................... 382/167 |
| 6,600,833 | B1 * | 7/2003 | Tan et al. .................. 382/167 |
| 6,897,983 | B1 * | 5/2005 | Kawano .................... 358/3.26 |

* cited by examiner

Primary Examiner—Yubin Hung

(57) ABSTRACT

A computer method for transforming a sensor color space of a digital image to standard color space. The color pixels in the sensor color space digital image are grouped and multiplied by multiple color conversion matrices without amplifying sensor noise. Different color conversion matrices are used for different parts of the image. The sum of the color error and amplified noise is minimized.

19 Claims, 3 Drawing Sheets

DIGITAL PICTURE IMAGE COLOR CONVERSION

FIELD OF THE PRESENT INVENTION

The present invention relates to color converting digital picture images, and more specifically to the correction of color imbalances while minimizing amplified noise.

BACKGROUND OF PRESENT INVENTION

Digital color picture images acquired with a single sensor camera pass light through a color filter array (CFA) onto charge coupled device (CCD), or other a sensor array. The sensor readings are digitized to form the electronic image. The spectral sensitivity of each pixel in a sensor array is typically adjusted by three sets of filters in a typical CFA. Commonly used filter sets include red R, green G and blue B color channels, or alternatively cyan, magenta and yellow color channels. Each pixel of the acquired picture area has an associated raw digital intensity value for each filter color channel. Similarly, a digital color picture image can be acquired using a multiple-sensor camera that uses three CCD's.

Such digitized images will often be "out of balance" on a color display. One reason this occurs is the images are acquired under lighting conditions that affect the color intensity values recorded. A scene illuminated by tungsten lamps will have a yellow color cast. If the raw pixel values were simply displayed, the reproduced image would have a yellow cast. Human vision is tolerant of considerable variation in lighting color cast and compensates accordingly. Further color imbalance can result when the color channels in the CFA of a display device for displaying the image do not exactly match those initially used when the image was acquired.

Color conversion processing is therefore often required to correct any color imbalance in an acquired image to be displayed. One common color conversion method calculates new pixel values by multiplying a matrix of raw pixel values with a color conversion matrix $C_{NOMINAL}$. That is, new channel values for each pixel can be calculated:

$$\begin{bmatrix} R_{new} \\ G_{new} \\ B_{new} \end{bmatrix} = C_{NOMINAL} \begin{bmatrix} R_{raw} \\ G_{raw} \\ B_{raw} \end{bmatrix} \quad (1)$$

where $C_{NOMINAL}$ can be calculated by a least-square solution to minimize the sum of a squared-difference between a spectral sensitivity function of the color-converted space and the standard color space. A suggested value for $C_{NOMINAL}$ is often provided by sensor manufacturers. The new red channel value $R_{new}$, for example, is therefore a weighted sum of the raw red $R_{raw}$, green $G_{raw}$ and blue $B_{raw}$ color channel values.

Each raw channel value includes inherent noise acquired during the image capture process from various noise sources. Possible noise sources include thermally generated readout noise, shot noise and fixed pattern noise. Thermally generated readout noise results from thermal agitation of electrons in the readout circuitry of the sensor. Shot noise results from the collision of photons upon impact with the sensor. Fixed pattern noise results from the inherent non-uniform characteristics of the sensor which are related to imperfections in the sensor manufacturing process. But multiplying the raw values by a color conversion matrix $C_{NOMINAL}$ effectively amplifies any inherent noise present, and often causes undesirable visual effects when the image is displayed after color conversion.

There is a need for an alternative method of color converting a color picture image which simultaneously minimizes both the color error and amplified noise.

Another color conversion application is in image/video compression. Since the RGB space is not an efficient space from compression viewpoint, R,G and B values are converted to YUV or YCbCr color space values before applying JPEG compression. The conversion from RGB space to YUV or YCbCr is thus, $$\begin{bmatrix} Y \\ Cb \\ Cr \end{bmatrix} = C_{NOMINAL2} \begin{bmatrix} R \\ G \\ B \end{bmatrix}.$$

SUMMARY OF THE PRESENT INVENTION

Briefly, a method embodiment of the present invention transforms the sensor color space of a digital image to standard color space. The color pixels in the sensor color space digital image are grouped and multiplied by multiple color conversion matrices. Different color conversion matrices are used for different parts of the image. The sum of the color error and amplified noise is minimized.

DETAILED DESCRIPTION OF THE EMBODIMENTS

Figure 1A:
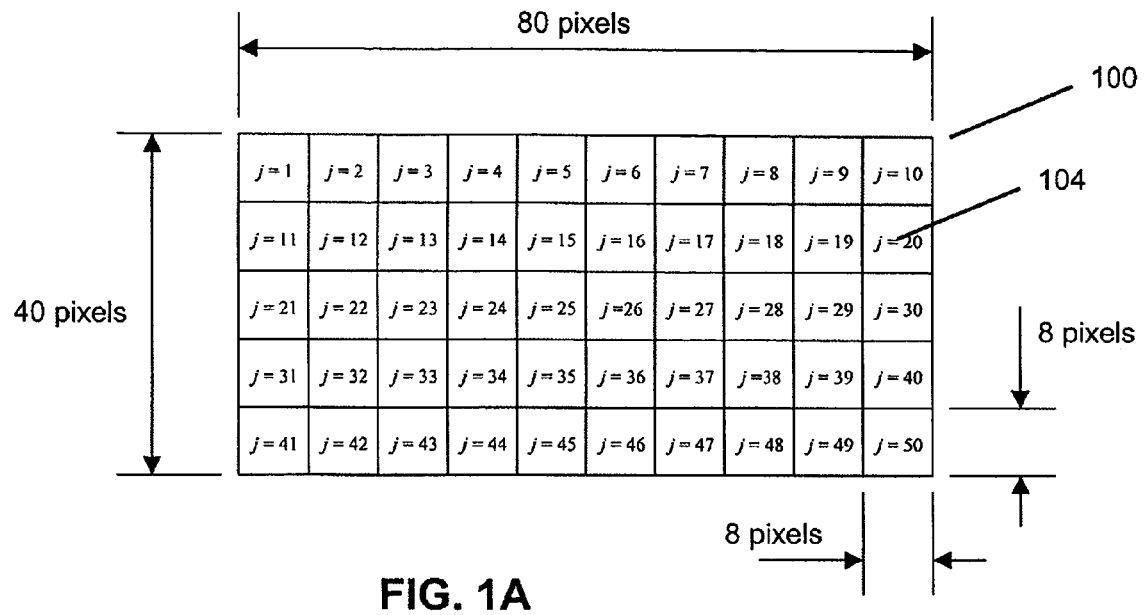
FIG. 1 is a diagram illustrating how an acquired picture area is divided into pixel groups according to an embodiment of the present invention.
Figure 1B:
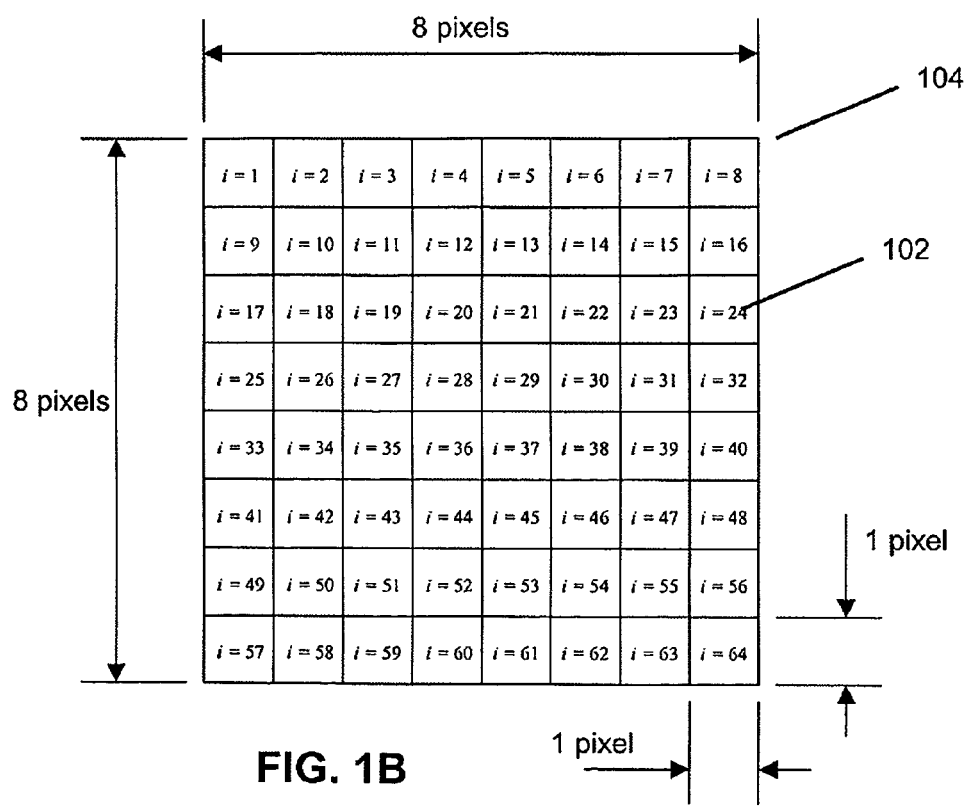

FIGS. 1A and 1B represent a digitized picture area of an acquired color picture image 100, with 3200 pixels arranged as 8×8 blocks 104. Each block 104 has an address-j. In FIG. 1A, ten such blocks 104 are in each row for 80-pixels total, and five such blocks are in each column for 40-pixels total. Other configurations are possible, e.g., 1024×1024. FIG. 1B details a single representative one of these 8×8 blocks 104. There are sixty-four pixels 102 in each 8×8 block 104. Each pixel 102 is assigned an address-i.

Each 8×8 block 104 is allocated a pixel group position j ranging from 1 to the total number of pixel groups M. For the present example, j ranges from 1 to M, where M is fifty. Each pixel 102 in the 8×8 block 104 is allocated a pixel position i ranging from 1 to the total number of pixels N in the 8×8 block 104. For the present example, i ranges from 1 to N, where N is sixty-four.

Each pixel 102 has corresponding raw or unprocessed intensity values for its red $R_{raw}$, green $G_{raw}$ and blue $B_{raw}$ channels. A matrix of sixty-four raw values for each color channel of an arbitrary 8×8 block 104 is shown in Table I.

TABLE I $$C_{NOMINAL} = \begin{bmatrix} 3.7423 & -0.9882 & 0.1377 \\ -2.1828 & 1.8432 & -0.5416 \\ 0.7365 & -1.4519 & 1.4612 \end{bmatrix}$$

$$R_{raw} = \begin{bmatrix} 9.9056 & 10.2406 & 10.2560 & 10.0484 & 9.9619 & 9.6322 & 10.1036 & 9.6157 \\ 11.0756 & 10.6307 & 10.8943 & 9.8574 & 9.0032 & 8.8382 & 9.1237 & 8.8941 \\ 10.0383 & 10.1614 & 9.2518 & 9.2606 & 9.9523 & 10.0369 & 10.0035 & 10.0032 \\ 10.5189 & 9.3786 & 10.1702 & 9.1821 & 10.2582 & 9.4736 & 9.4190 & 9.2882 \\ 10.7238 & 10.4094 & 9.8291 & 9.1034 & 8.3382 & 9.1025 & 10.2999 & 8.8793 \\ 9.9074 & 9.8120 & 10.4366 & 10.1968 & 9.8154 & 9.1626 & 9.4023 & 9.2523 \\ 9.4652 & 9.8774 & 9.6744 & 9.0998 & 9.2259 & 8.3596 & 9.4886 & 8.8105 \\ 8.1055 & 6.7972 & 6.9037 & 7.1799 & 7.2488 & 7.8111 & 6.4927 & 6.6884 \end{bmatrix}$$

$$G_{raw} = \begin{bmatrix} 29.2733 & 27.8347 & 27.9608 & 26.3519 & 25.4117 & 25.3925 & 24.4934 & 24.3332 \\ 28.3425 & 28.8148 & 28.1860 & 26.6158 & 25.8793 & 25.9527 & 25.0389 & 25.1576 \\ 28.4377 & 27.6641 & 26.5578 & 27.3755 & 26.8409 & 25.3446 & 24.4212 & 25.7169 \\ 27.5842 & 26.6267 & 26.9682 & 25.9660 & 26.1780 & 25.9053 & 24.8976 & 24.9925 \\ 27.9324 & 27.7026 & 26.9077 & 28.2971 & 26.3761 & 26.5929 & 25.7855 & 24.8191 \\ 27.9661 & 26.8686 & 26.1085 & 26.0136 & 26.2207 & 25.9727 & 23.8461 & 22.3109 \\ 27.2113 & 26.0600 & 25.1640 & 24.7046 & 23.5585 & 22.6644 & 23.4568 & 23.2060 \\ 20.6607 & 20.9997 & 19.2520 & 18.9764 & 19.6179 & 19.0893 & 18.7717 & 18.2214 \end{bmatrix}$$

$$B_{raw} = \begin{bmatrix} 30.9717 & 30.4938 & 30.5209 & 28.5070 & 27.6293 & 27.6245 & 26.9592 & 25.3052 \\ 31.6895 & 30.0883 & 28.6683 & 28.0756 & 27.3752 & 26.1468 & 26.8846 & 26.8315 \\ 30.0772 & 31.0242 & 29.8533 & 29.4920 & 28.1474 & 27.2521 & 26.8467 & 26.8692 \\ 29.6528 & 28.5751 & 27.9879 & 28.8576 & 29.1462 & 27.3834 & 28.2576 & 27.4453 \\ 30.5855 & 29.5030 & 29.0353 & 29.7141 & 28.2760 & 28.8488 & 28.0663 & 26.5923 \\ 28.9157 & 29.7320 & 29.5171 & 29.0579 & 27.4110 & 27.4681 & 26.9114 & 25.4566 \\ 29.2023 & 28.1437 & 27.0938 & 26.9059 & 26.2134 & 25.1823 & 26.3845 & 24.5598 \\ 25.0145 & 24.5517 & 22.5275 & 23.2156 & 22.2232 & 22.8379 & 21.7008 & 22.0221 \end{bmatrix}$$

$$Cor = \begin{bmatrix} 89.0614 & 239.4668 & 260.4661 \\ 239.4668 & 646.1170 & 702.3732 \\ 260.4661 & 702.3732 & 764.5824 \end{bmatrix}, \quad Cor_{NN} = \begin{bmatrix} 0.2043 & 0 & 0 \\ 0 & 0.3033 & 0 \\ 0 & 0 & 0.3168 \end{bmatrix},$$

$$C_{NEW} = \begin{bmatrix} 0.8839 & 0.0124 & 0.1923 \\ -0.2983 & 0.6309 & -0.0697 \\ 0.1104 & -0.3452 & 0.6572 \end{bmatrix}$$

$$R_{new} = \begin{bmatrix} 12.4077 & 15.0173 & 14.9540 & 15.4898 & 15.9741 & 14.7582 & 17.3196 & 15.4243 \\ 17.8048 & 15.4529 & 16.8649 & 14.4548 & 11.8894 & 11.0301 & 13.1031 & 12.1193 \\ 13.6070 & 14.9624 & 12.4903 & 11.6656 & 14.5971 & 16.2690 & 17.0008 & 15.7223 \\ 16.1903 & 12.7208 & 15.2650 & 12.6772 & 16.5347 & 13.6250 & 14.5370 & 13.8417 \\ 16.7416 & 15.6431 & 14.1926 & 10.1971 & 9.0339 & 11.7587 & 16.9299 & 12.3656 \\ 13.4231 & 14.2630 & 17.3220 & 16.4550 & 14.5964 & 12.4062 & 15.3279 & 16.0835 \\ 12.5537 & 15.0882 & 15.0694 & 13.3469 & 14.8560 & 12.3556 & 15.9634 & 13.4220 \\ 13.3617 & 8.0670 & 9.9138 & 11.3143 & 10.8016 & 13.5129 & 8.7363 & 10.0566 \end{bmatrix}$$

$$G_{new} = \begin{bmatrix} 10.0471 & 11.6843 & 11.5521 & 10.7927 & 10.8116 & 10.5896 & 11.2702 & 8.7268 \\ 13.3091 & 9.9561 & 8.9884 & 9.6385 & 9.0554 & 7.0323 & 9.6474 & 9.2284 \\ 10.0510 & 12.6487 & 11.8742 & 10.1654 & 9.4864 & 10.4131 & 11.1368 & 9.2884 \\ 11.0240 & 9.9998 & 9.2290 & 11.2272 & 12.1337 & 9.3760 & 12.0762 & 10.6552 \\ 12.0323 & 10.5527 & 10.5961 & 9.0361 & 9.1605 & 10.2454 & 11.1563 & 9.3595 \\ 8.9423 & 11.6582 & 12.9079 & 12.1980 & 9.2101 & 9.1727 & 11.6236 & 11.6164 \\ 10.1312 & 10.5598 & 10.1771 & 10.1463 & 10.8914 & 10.0449 & 11.4825 & 8.6810 \\ 12.5218 & 10.3899 & 10.0482 & 11.6572 & 9.3263 & 11.4062 & 9.2348 & 10.6474 \end{bmatrix}$$

TABLE I-continued $$B_{new} = \begin{bmatrix} 15.5610 & 12.4368 & 12.6211 & 11.1993 & 10.1306 & 10.8175 & 8.4915 & 10.1569 \\ 10.9027 & 13.6115 & 12.6463 & 12.3363 & 13.2226 & 14.3835 & 11.6764 & 12.4252 \\ 14.2157 & 12.0081 & 12.5886 & 14.2723 & 12.5053 & 10.0476 & 8.6379 & 11.0146 \\ 11.8233 & 13.1311 & 12.3506 & 12.1892 & 10.0747 & 12.2395 & 10.0277 & 10.9282 \\ 11.5126 & 12.3615 & 12.4164 & 16.1939 & 15.1021 & 13.5232 & 9.8451 & 11.9629 \\ 14.2611 & 12.0044 & 9.3563 & 9.9537 & 12.0597 & 12.9968 & 8.8552 & 7.1407 \\ 13.6799 & 11.2313 & 10.5915 & 11.1009 & 9.0882 & 9.8896 & 8.2345 & 10.2408 \\ 6.8417 & 10.5729 & 8.2154 & 6.7319 & 8.3015 & 5.7668 & 8.6751 & 7.0597 \end{bmatrix}$$

The red channel raw pixel value for a pixel position i in the 8×8 block 104 is labeled $R_{raw}(i)$. The value for i=10 is therefore 10.6307. The color matrix of raw values corresponding to the pixel i=10 can be represented as, $$\begin{bmatrix} R_{raw}(10) \\ G_{raw}(10) \\ B_{raw}(10) \end{bmatrix} = \begin{bmatrix} 10.6307 \\ 28.8148 \\ 30.0883 \end{bmatrix}$$

and can be substituted into Eq. 1 for color conversion of the tenth pixel where $C_{NOMINAL}$ is a suitable tristimulus conversion matrix as shown in Table I.

A color conversion method embodiment of the present invention accounts for the sum of color error and noise in the raw values, which can be derived for each pixel i in each respective 8×8 block 104.

Each raw color channel value in Eq. 1 includes noise, and therefore, $$\begin{bmatrix} R_{raw} \\ G_{raw} \\ B_{raw} \end{bmatrix} = \begin{bmatrix} R \\ G \\ B \end{bmatrix} + \begin{bmatrix} N_R \\ N_G \\ N_B \end{bmatrix} \tag{2}$$

where $N_R$, $N_G$ and $N_B$ are independent noise values in the red, green and blue color channels, respectively, and R, G and B are actual red, green and blue values, respectively.

Considering Eq. 1 for a substantially noise-free system, the new noise-free green channel value $G^*_{new}$ can be theoretically calculated:

$$G^*_{new} = \begin{bmatrix} \alpha^* & \beta^* & \gamma^* \end{bmatrix} \begin{bmatrix} R \\ G \\ B \end{bmatrix} \tag{3}$$

where $\alpha^*$, $\beta^*$ and $\gamma^*$ are weights for the green channel in $C_{NOMINAL}$, e.g., second row in $C_{NOMINAL}$.

In a noisy system, however, it is desirable to perform color conversion using a color conversion matrix $C_{NEW}$ of the present invention, wherein, $$\begin{bmatrix} R_{new} \\ G_{new} \\ B_{new} \end{bmatrix} = C_{NEW} \begin{bmatrix} R_{raw} \\ G_{raw} \\ B_{raw} \end{bmatrix} \tag{4}$$

Analogous to Eq. 3, the green channel in a system subject to noise can be expressed as, $$G_{new} = \begin{bmatrix} \alpha & \beta & \gamma \end{bmatrix} \begin{bmatrix} R_{raw} \\ G_{raw} \\ B_{raw} \end{bmatrix} \tag{5}$$

where, $\alpha$, $\beta$ and $\gamma$ are weights for the green channel in the new color conversion matrix $C_{NEW}$ (e.g., second row in $C_{NEW}$).

Substituting Eq. 2 into Eq. 5 yields, $$G_{new} = \begin{bmatrix} \alpha & \beta & \gamma \end{bmatrix} \begin{bmatrix} R + N_R \\ G + N_G \\ B + N_B \end{bmatrix} \tag{6}$$

$C_{NEW}$ can be derived so as to minimize the expected value f of the sum of color error and noise wherein, when considering the green channel, $$f = E[(G_{new} - G^*_{new})^2] \tag{7}$$

where E is the expected value.

Substituting Eqs. 3 and 6 into Eq. 7 yields, $$f = E[((\alpha - \alpha^*)R + (\beta - \beta^*)G + (\gamma - \gamma^*)B + \alpha N_R + \beta N_G + \gamma N_B)^2] \tag{8}$$

$$= (\alpha - \alpha^*)^2 E[R^2] + (\beta - \beta^*)^2 E[G^2] + (\gamma - \gamma^*)^2 E[B^2] +$$
$$2(\alpha - \alpha^*)(\beta - \beta^*)E[RG] + 2(\beta - \beta^*)(\gamma - \gamma^*)E[GB] +$$
$$2(\gamma - \gamma^*)(\alpha - \alpha^*)E[BR] + \alpha^2 \sigma_R^2 + \beta^2 \sigma_G^2 + \gamma^2 \sigma_B^2 \tag{9}$$

where, $\sigma_R$, $\sigma_G$, $\sigma_B$ are estimated standard deviations of noise values $N_R$, $N_G$, and $N_B$ respectively.

Eq. 9 can be minimized by taking partial derivatives with respect to $\alpha$, $\beta$ and $\gamma$ to yield, $$Cor \begin{bmatrix} \alpha \\ \beta \\ \gamma \end{bmatrix} = (Cor - Cor_{NN}) \begin{bmatrix} \alpha^* \\ \beta^* \\ \gamma^* \end{bmatrix} \tag{10}$$

where, Cor is the correlation matrix of $[R_{raw} \ G_{raw} \ B_{raw}]^T$ values and $Cor_{NN}$ is the correlation matrix of $[N_R \ N_G \ N_B]^T$ values.

Re-arranging Eq. 10 yields, $$\begin{bmatrix} \alpha \\ \beta \\ \gamma \end{bmatrix} = (Cor)^{-1}(Cor - Cor_{NN})\begin{bmatrix} \alpha^* \\ \beta^* \\ \gamma^* \end{bmatrix} \quad (11)$$

A similar derivation can be applied to obtain the weights of the red and blue channels, and combining them yields the new color conversion matrix $$C_{NEW} = C_{NOMINAL}(Cor - Cor_{NN})^T(Cor^{-1})^T \quad (12)$$

where Cor and $Cor_{NN}$ can be estimated:

$$Cor = \quad (13)$$

$$\frac{1}{N}\begin{bmatrix} \sum_{i=1}^{N} R_{raw}(i).R_{raw}(i) & \sum_{i=1}^{N} R_{raw}(i).G_{raw}(i) & \sum_{i=1}^{N} R_{raw}(i).B_{raw}(i) \\ \sum_{i=1}^{N} R_{raw}(i).G_{raw}(i) & \sum_{i=1}^{N} G_{raw}(i).G_{raw}(i) & \sum_{i=1}^{N} G_{raw}(i).B_{raw}(i) \\ \sum_{i=1}^{N} R_{raw}(i).B_{raw}(i) & \sum_{i=1}^{N} G_{raw}(i).B_{raw}(i) & \sum_{i=1}^{N} B_{raw}(i).B_{raw}(i) \end{bmatrix}$$

$$Cor_{NN} = \begin{bmatrix} \sigma_R^2 & 0 & 0 \\ 0 & \sigma_G^2 & 0 \\ 0 & 0 & \sigma_B^2 \end{bmatrix} \quad (14)$$

In embodiments of the resent invention, $C_{NEW}$ is based on actual pixel values, instead of $C_{NOMINAL}$ being a constant matrix based on the difference between color spaces.

Substituting Eq. 12 into Eq. 4 for each respective 8×8 block 104 yields, $$\begin{bmatrix} R_{new}(i) \\ G_{new}(i) \\ B_{new}(i) \end{bmatrix} = C_{NOMINAL}(Cor - Cor_{NN})^T(Cor^{-1})^T \begin{bmatrix} R_{raw}(i) \\ G_{raw}(i) \\ B_{raw}(i) \end{bmatrix} \quad (15)$$

where, i is the pixel position in the 8×8 block 104.

Figure 2:
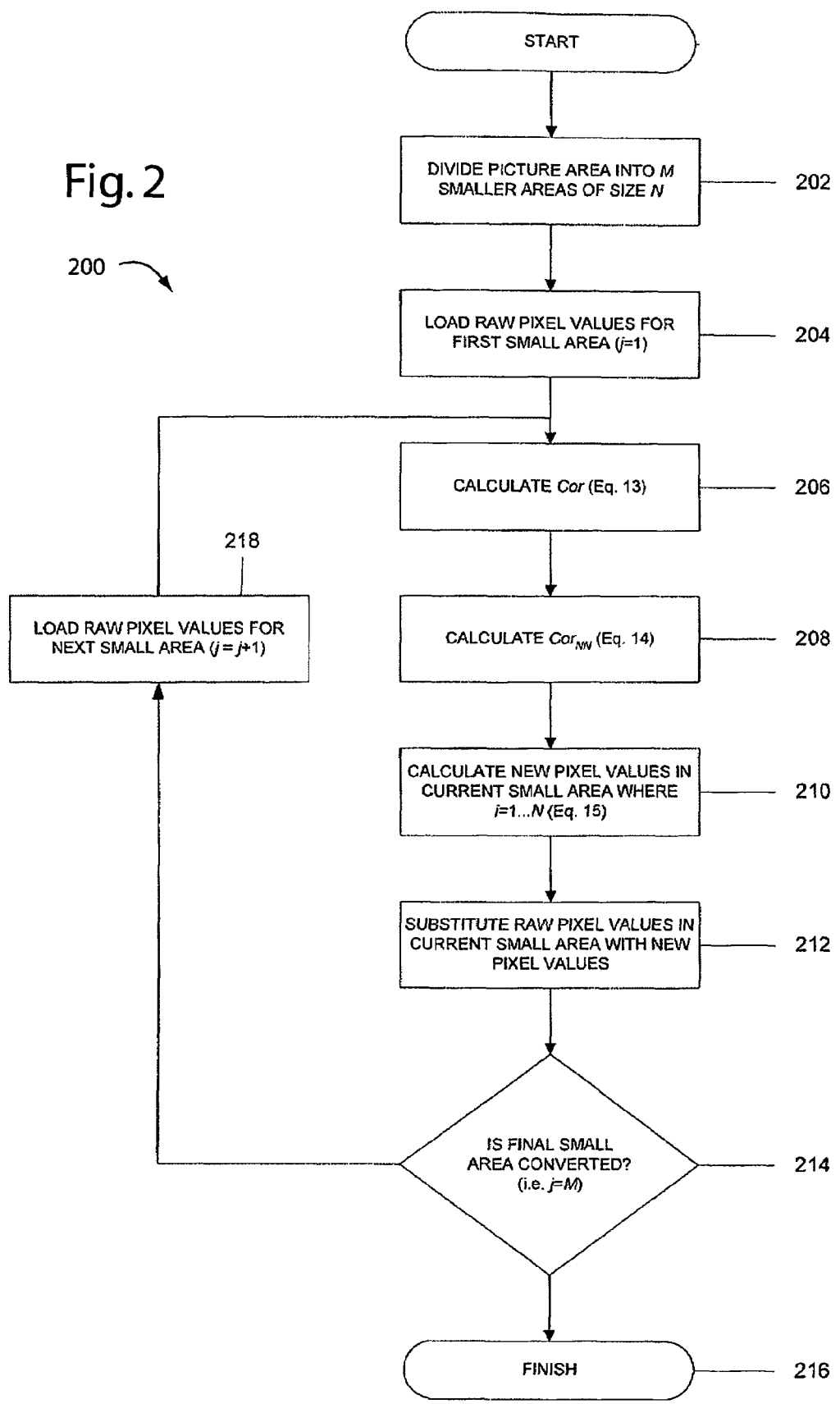
FIG. 2 is a flowchart diagram of a method embodiment of the present invention for color converting a picture image.

FIG. 2 represents a method embodiment of the present invention, and is referred to herein by the reference numeral 200. Method 200 can be implemented with software, for example, on a processing system 300 (FIG. 3).

Figure 3:
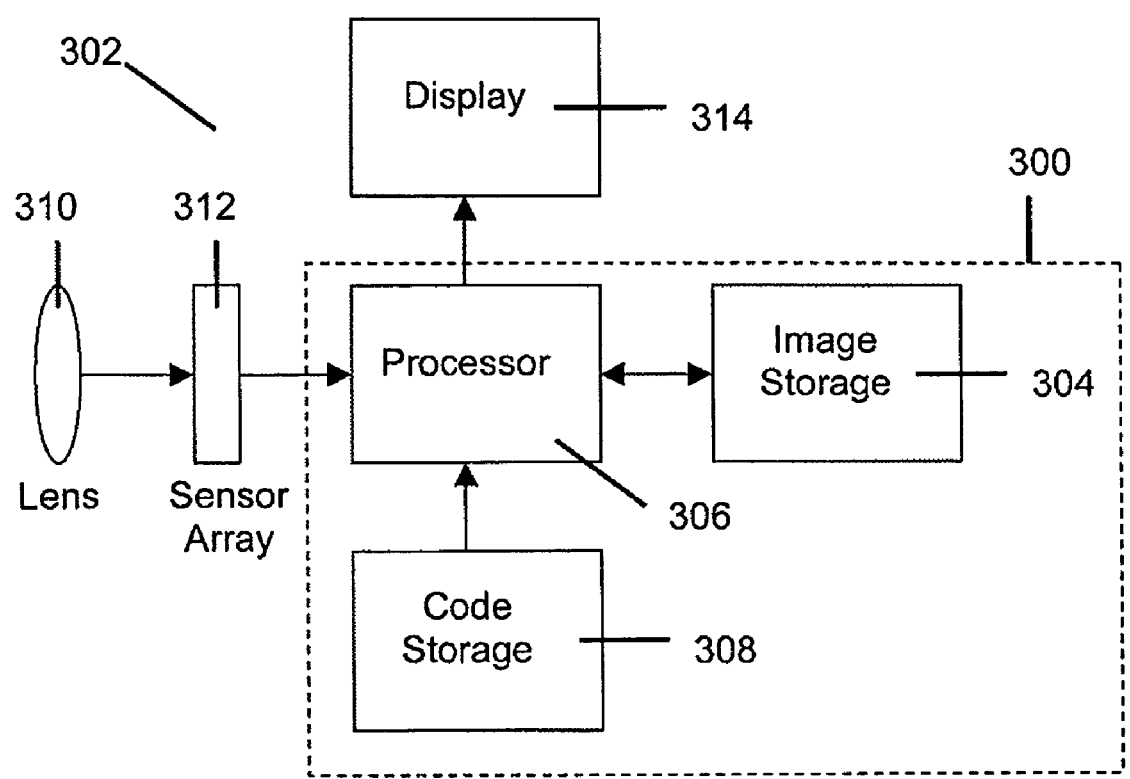
FIG. 3 is a functional block diagram of a digital camera and a processing system embodiment of the present invention.

FIG. 3 represents a camera embodiment of the present invention, and is referred to herein by the reference numeral 300. Camera 300 comprises a processing system 302 which includes an image memory 304, a microprocessor 306, and a program memory 308. Light from an image passes through a lens and color filter array 310, onto an image sensor array 312. Sensor readings are digitized by processor 306 to form a picture image 100 (FIG. 1) and is stored in the image memory 304. The raw sensor color values acquired are color converted by processing system 302, e.g., according to method 200 (FIG. 2).

Referring again to method 200 in FIG. 2, the processing is initiated with matrix $C_{NOMINAL}$ known and constant when converting each respective 8×8 block 104, see Table I. A step 202 divides a picture image 100 (FIG. 1) into M multiple pixel groups 104 of N pixels 102. For the present example, M=50 and N=64. A square block of sixty-four pixels will generally yield good results although this number can be varied. If N is too large, the method becomes less effective since $C_{NEW}$ cannot adapt to changes in the local signal (R,G,B) statistics. If N is too small, the accuracy of estimating Cor (eq. 13) is significantly degraded and the method is less effective. Thus, a compromise is generally required for the block size N owing to the statistical nature of the values used for performing the color conversion. Better conversion results are obtained if N is neither too small wherein not enough pixel values are considered for estimating signal statistics, nor too large wherein the different signal statistics of various image regions are not properly accounted for. An 8×8 square block of sixty-four pixels provides a good compromise.

A step 204 loads the raw pixel values of the red $R_{raw}$, green $G_{raw}$ and blue $B_{raw}$ channels for each pixel in the first 8×8 block 104 (e.g., j=1), as indicated in Table I. A step 206 calculates a correlation matrix Cor in accordance with Eq. 13 for the position j of the current 8×8 block 104. The Cor for j=1 is indicated in Table I. A step 208 calculates a correlation matrix $Cor_{NN}$ in accordance with Eq. 14 for a position j of the current 8×8 block 104. The $Cor_{NN}$ for j=1 is indicated in Table I.

A step 210 calculates new pixel values for each pixel position i, in accordance with Eq. 15, where i varies from 1 to N for a current 8×8 block 104. Table I indicates newly calculated pixel values for the red $R_{new}$, green $G_{new}$ and blue $B_{new}$ channels for j=1. A step 212 substitutes raw pixel values with a corresponding converted new pixel values calculated in step 210 for a current 8×8 block 104.

A step 214 checks if the last 8×8 block 104 in a picture image 100 has been converted. If so, then the image conversion has been completed, and finishes as step 216. If not, the raw pixel values for the red $R_{raw}$, green $G_{raw}$ and blue $B_{raw}$ channels of a next-to-be-converted 8×8 block 104 are loaded in a step 218 by incrementing j (e.g., j=j+1). Steps 206 to 212 are repeated in a loop.

The acquired picture image 100 stored in the image memory 304 may be transferred from the digital camera 302 to a PC via a disk storage medium. The PC also contains a processing system 300 and can therefore be used to convert the picture image 100 after acquisition, according to method 200 (FIG. 2).

Each block 104 can be other than 8×8. Although each 8×8 block 104 in one embodiment is a square block of sixty-four pixels, this area can be rectangular, circular or even scattered wherein each 8×8 block 104 is effectively a set of pixels, the set comprising statistically similar pixels within the entire picture image 100 which are grouped according to clustering or vector quantization algorithms. Each 8×8 block 104 need not be of the same size when dividing a given picture image 100 and, in fact, pixel groups 104 can overlap or may be displaced such that some areas of the picture image 100 are not color converted at all. Being able to calculate the inverse of the correlation matrix Cor in Eq. 15 is sometimes difficult to implement. The computational complexity of this calculation may be reduced by using alternative numerical algorithms, e.g., conjugate gradient or steepest descent methods, wherein the initial starting point for $C_{NEW}$ is either $C_{NOMINAL}$ or the $C_{NEW}$ matrix of an adjacent 8×8 block 104.

According to another embodiment of the present invention, there may be more than three color channels, and therefore more than three corresponding values, for each pixel in the picture image 100. The present invention is not to be limited to converting only three color channels of the RGB color space. In another embodiment of the present invention, different color channels may be used such as cyan, magenta and yellow. Alternatively, cyan, magenta, yellow and black (CMYK) or cyan, magenta, yellow and white could be used.

In a further an embodiment of the present invention, the conversion method could be applied to the entire picture image 100. For larger images, edges could be detected before, and subsequently re-inserted after color conversion processing is undertaken to minimize blur at the edges.

Further, one embodiment involved processing raw pixel values, however, the same color conversion technique can be applied to the pixel values of a compressed image such as a JPEG or like compression processed image file. In addition, the processing may be done after the picture image 100 is acquired. In other words, the image may be acquired and stored, and then subsequently retrieved and processed using the aforementioned technique.

Each color channel has different noise statistics and $C_{NEW}$ is adaptively weighted depending on the noise characteristics of the 8×8 block 104. According to another embodiment of the present invention, the weights for a given color channel could be manually selected and inserted into $C_{NEW}$ for particularly noisy channels.

These and other variations and embodiments should be considered to fall within the scope of the invention disclosed.

The invention claimed is:

1. A method, comprising:
   determining a correlation matrix (Cor) from color values of a color digital image;
   ascertaining a correlation matrix ($Cor_{NN}$) of noise in the image;
   calculating a new color conversion matrix $C_{NEW}$ in accordance with $C_{NEW}=C_{NOMINAL}(Cor-Cor_{NN})^T(Cor^{-1})^T$, where $C_{NOMINAL}$ is a nominal color conversion matrix; and
   color converting the color values of the image by applying the new color conversion matrix $C_{NEW}$ to the color values.

2. The method of claim 1, further comprising dividing the image into a plurality of image areas.

3. The method of claim 2, wherein:
   the ascertaining comprises ascertaining for each image area j a respective correlation matrix $Cor_{NN}(j)$ comprising values of noise variation determined forte respective image area j.

4. The method of claim 2, wherein:
   the determining comprises determining for each image area j a respective correlation matrix Cor(j) having values derived from color values in the respective image area j.

5. The method of claim 2, wherein:
   the dividing comprises grouping pixels of the image into the image areas based on local statistics determined from the color values of the image.

6. The method of claim 2, wherein:
   the dividing comprises grouping pixels of the image into the image areas in accordance with a clustering process or a vector quantization process applied to the color values of the image.

7. The method of claim 2, wherein:
   the calculating comprises calculating for each image area j a respective new color conversion matrix $C_{NEW}(j)$ based on the nominal color conversion matrix $C_{NOMINAL}$ or the respective new color conversion matrix $C_{NEW}(k)$ calculated for an image area k adjacent to the image area j.

8. The method of claim 1, wherein the determining, ascertaining, calculating, and color converting are performed on color values of the image in three or more color channels.

9. The method of claim 1, wherein the color converting comprises applying the new color conversion matrix $C_{NEW}$ to all the color values in only a portion of the image.

10. The method of claim 1, wherein the color converting comprises applying the new color conversion matrix $C_{NEW}$ to all the color values of the image.

11. A method, comprising:
    dividing a color digital image into a plurality of image areas;
    for each of the image areas, calculating a respective color conversion matrix based on the color values of the image area wherein;
    the calculating comprises, for each image area j, calculating a respective color conversion matrix $C_{NEW}(j)$ in accordance with $C_{NEW}(j)=C_{NOMINAL}(Cor(j)-Cor_{NN}(j))^T(Cor^{-1}(j))^T$ wherein $C_{NOMINAL}$ is a nominal color conversion matrix, each of the Cor(j) is a respective correlation matrix determined from color values of the image area j, and each of the $Cor_{NN}(j)$ is a respective correlation matrix of noise in the image area j; and
    color converting each of the image areas by applying its respective color conversion matrix to color values of the image area.

12. The method of claim 11, wherein:
    prior to the color converting, each image area j has color values ($R_{j,raw}$ $G_{j,raw}$ $B_{j,raw}$) in a red, green, blue color space.

13. The method of claim 12, wherein:
    each color correlation matrix Cor(j) is determined in accordance with $$Cor = \frac{1}{N}\begin{bmatrix} \sum_{i=1}^{N} R_{raw}(i).R_{raw}(i) & \sum_{i=1}^{N} R_{raw}(i).G_{raw}(i) & \sum_{i=1}^{N} R_{raw}(i).B_{raw}(i) \\ \sum_{i=1}^{N} R_{raw}(i).G_{raw}(i) & \sum_{i=1}^{N} G_{raw}(i).G_{raw}(i) & \sum_{i=1}^{N} G_{raw}(i).B_{raw}(i) \\ \sum_{i=1}^{N} R_{raw}(i).B_{raw}(i) & \sum_{i=1}^{N} G_{raw}(i).B_{raw}(i) & \sum_{i=1}^{N} B_{raw}(i).B_{raw}(i) \end{bmatrix}$$

where i is the pixel position in the image area j, and $N_j$ is a respective total number of pixels in the image area j.

14. The method of claim 12, wherein:
    each correlation matrix $Cor_{NN}(j)$ is determined in accordance with $$Cor_{NN}(j) = \begin{bmatrix} \sigma_R^2 & 0 & 0 \\ 0 & \sigma_G^2 & 0 \\ 0 & 0 & \sigma_B^2 \end{bmatrix}$$

where $\sigma_R(j)$ is a standard deviation of noise values in the red color channel of image area j, $\sigma_G(j)$ is a standard deviation of noise values in the green color channel of image area j, and $\sigma_B(j)$ is a standard deviation of noise values in the blue color channel of image area j.

15. The method of claim 11, further comprising calculating the nominal color conversion matrix $C_{NOMINAL}$ by minimizing, over all color conversion matrices applied to the image, the sum of a squared difference between a spectral sensitivity function of color values in the color-converted image and a standard color space.

16. The method of claim 11, wherein:
    prior to the color converting, each image area j has color values in a four-channel color space.

17. A system, comprising:
a memory storing a color digital image; and
a processing system operable to:
- determine a correlation matrix (Cor) from color values of the image;
- ascertain a correlation matrix ($Cor_{NN}$) of noise values in the image;
- calculate a new color conversion matrix $C_{NEW}$ in accordance with $C_{NEW} = C_{NOMINAL}(Cor - Cor_{NN})^T (Cor^{-1})^T$, where $C_{NOMINAL}$ is a nominal color conversion matrix; and
- color convert the color values of the image by applying the new color conversion matrix $C_{NEW}$ to the color values.

18. The system of claim 17, wherein the processing system additionally is operable to:
- divide the image into a plurality of image areas;
- ascertain for each image area j a respective correlation matrix $Cor_{NN}(j)$ comprising values of noise variation determined for the respective image area j; and
- determine for each image area j a respective correlation matrix $Cor(j)$ having values derived from color values in the respective image area j.

19. A system, comprising:
a memory storing a color digital image; and
a processing system operable to:
- divide the image into a plurality of image areas;
- for each image area j, calculate a respective color conversion matrix $C_{NEW}(j)$ based on the color values of the image area in accordance with $$C_{NEW}(j) = C_{NOMINAL}(Cor(j) - Cor_{NN}(j))^T (Cor^{-1}(j))^T$$

wherein $C_{NOMINAL}$ is a nominal color conversion matrix, each of the $Cor(j)$ is a respective correlation matrix determined from color values of the image area j, and each of the $Con_{NN}(j)$ is a respective correlation matrix of noise in the image area j; and
- color convert each of the image areas by applying its respective color conversion matrix to color values of the image area.

\* \* \* \* \*

UNITED STATES PATENT AND TRADEMARK OFFICE
CERTIFICATE OF CORRECTION

PATENT NO. : 7,394,929 B2
APPLICATION NO. : 10/669774
DATED : July 1, 2008
INVENTOR(S) : Suk Hwan Lim et al.

It is certified that error appears in the above-identified patent and that said Letters Patent is hereby corrected as shown below:

In column 9, line 40, in Claim 3, delete "forte" and insert -- for the --, therefor.

In column 10, lines 31-39, in Claim 13, delete $$\text{"} Cor = \frac{1}{N} \begin{vmatrix} \sum_{i=1}^{N} R_{row}(i) \cdot R_{row}(i) & \sum_{i=1}^{N} R_{row}(i) \cdot G_{row}(i) & \sum_{i=1}^{N} R_{row}(i) \cdot B_{row}(i) \\ \sum_{i=1}^{N} R_{row}(i) \cdot G_{row}(i) & \sum_{i=1}^{N} G_{row}(i) \cdot G_{row}(i) & \sum_{i=1}^{N} G_{row}(i) \cdot B_{row}(i) \\ \sum_{i=1}^{N} R_{row}(i) \cdot B_{row}(i) & \sum_{i=1}^{N} G_{row}(i) \cdot B_{row}(i) & \sum_{i=1}^{N} B_{row}(i) \cdot B_{row}(i) \end{vmatrix} \text{"}$$

and insert therefor $$-- Cor(j) = \frac{1}{N_j} \begin{bmatrix} \sum_{i=1}^{N_j} R_{j,row}(i) \cdot R_{j,row}(i) & \sum_{i=1}^{N_j} R_{j,row}(i) \cdot G_{j,row}(i) & \sum_{i=1}^{N_j} R_{j,row}(i) \cdot B_{j,row}(i) \\ \sum_{i=1}^{N_j} R_{j,row}(i) \cdot G_{j,row}(i) & \sum_{i=1}^{N_j} G_{j,row}(i) \cdot G_{j,row}(i) & \sum_{i=1}^{N_j} G_{j,row}(i) \cdot B_{j,row}(i) \\ \sum_{i=1}^{N_j} R_{j,row}(i) \cdot B_{j,row}(i) & \sum_{i=1}^{N_j} G_{j,row}(i) \cdot B_{j,row}(i) & \sum_{i=1}^{N_j} B_{j,row}(i) \cdot B_{j,row}(i) \end{bmatrix} --.$$

UNITED STATES PATENT AND TRADEMARK OFFICE
CERTIFICATE OF CORRECTION

PATENT NO. : 7,394,929 B2
APPLICATION NO. : 10/669774
DATED : July 1, 2008
INVENTOR(S) : Suk Hwan Lim et al.

It is certified that error appears in the above-identified patent and that said Letters Patent is hereby corrected as shown below:

In column 10, lines 48-52, in Claim 14, delete " $Cor_{NN}(j) = \begin{vmatrix} \sigma_R^2 & 0 & 0 \\ 0 & \sigma_G^2 & 0 \\ 0 & 0 & \sigma_B^2 \end{vmatrix}$ "

insert -- $Cor_{NN}(j) = \begin{bmatrix} \sigma_R^2(j) & 0 & 0 \\ 0 & \sigma_G^2(j) & 0 \\ 0 & 0 & \sigma_B^2(j) \end{bmatrix}$ --, therefor.

In column 12, line 16, in Claim 19, delete "$Con_{NN}(j)$" and insert -- $Cor_{NN}(j)$ --, therefor.

Signed and Sealed this

Tenth Day of February, 2009

JOHN DOLL
*Acting Director of the United States Patent and Trademark Office*